Patented Mar. 22, 1932

1,850,839

UNITED STATES PATENT OFFICE

PAUL LAEUGER, OF BASEL, SWITZERLAND, ASSIGNOR TO THE FIRM OF J. R. GEIGY S. A., OF BASEL, SWITZERLAND

MANUFACTURE OF ACID DYESTUFFS OF THE PHENONAPHTHOSAFRANINE SERIES AND THE PRODUCTS

No Drawing. Application filed January 21, 1928, Serial No. 248,566, and in Germany January 31, 1927.

The U. S. Patent application Ser. No. 166,021, filed February 4, 1927, discloses an improved manufacture of acid dyestuffs of the phenonaphthosafranine series, which can be obtained by condensing an unsymmetrical N-alkyl-paraphenylenediamine derivative having a sulpho-group in ortho position to the primary amino group according to the formula:

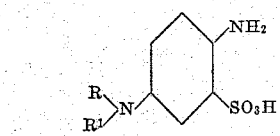

with an isorosindulinesulphonic acid of the general formula:

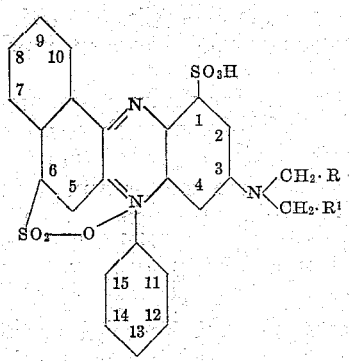

having at least two sulpho-groups, one of them being in position 6, the other in position 1 and the third, if it be present, in any position, whereby in the above formulæ R and R¹ stand for hydrogen or alkyl.

Now, it has been found that new acid dyestuffs of the phenonaphthosafranine series can be made on the base of the aforesaid process when such isorosinduline di- or trisulphonic acids are used as contain in the 1-position a halogen instead of a sulpho-group.

The dyestuffs are di- or tri-sulphonic acids, probably derived from the general formula:

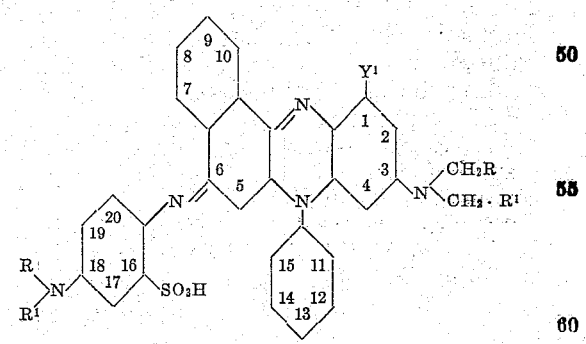

in which R and R¹ represent hydrogen, or alkyl and Y¹ represents halogen. One of the sulpho-groups is always in ortho-(16)-position to the safranine nitrogen.

The halogen has the effect that the blue tints of the dyeings are moved towards the green end of the spectrum without diminishing the good fastness to alkali and light, or the equalizing character of the dyestuffs described in the said specification and due to the presence of the sulpho-group in the 16-position. It is indeed surprising that there is no such depreciation. The 1-halogen isorosinduline sulphonic acids used for the condensation contain a sulpho-group in 6-position, a second, and it may also be a third, in another position. They may be made from 1-halogen neutral blue sulphonic acids by the process of the U. S. patent specification No. 617,703, that is to say by treatment with sulphite and subsequent oxidation of the leuco-sulphonic acid. The positions 4, 8, 9 and 11 to 15 may also be substituted by alkyl, alkyloxy-, hydroxy, carboxy-, acidylamino-, or sulpho-groups or halogen.

The following example illustrates the invention:—

The phenonaphthosafraninesulphonic acid of the following probable constitution:

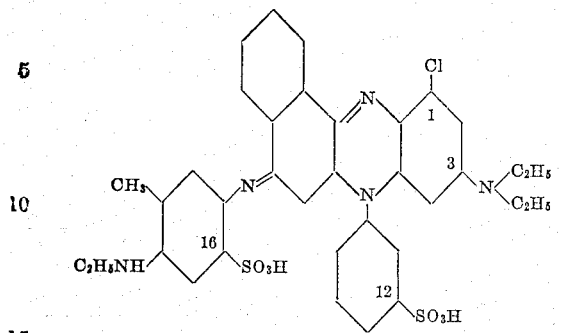

is made by suspending 45 parts by weight of meta-sulphophenyl-2-naphthylamine in 380 parts of ethyl alcohol and adding 47, 2 parts of nitroso-meta-chloro-diethylaniline of 100 per cent. strength (calculated on the free base) in the form of hydrochloride; the mixture is warmed and boiled for 10 hours in a reflux apparatus. The mass is cooled and the 1-chloro-3-diethyl-isorosinduline-12-monosulphonic acid which has separated is filtered, washed well with water and converted according to the prescription of the U. S. patent specification No. 617,703 into the easily soluble 1-chloro-3-diethylisorosinduline-6:12-disulphonic acid by means of 150 parts of commercial bisulphite solution. The aqueous solution of the disulphonic acid is greenish-blue; the acid dissolves in concentrated sulphuric acid to a clear reddish brown solution. Without separating this disulphonic acid the mass may be used for condensation with 35 parts of para-amino-mono-ethyl-ortho-toluidinesulphonic acid of 100 per cent. strength, the latter acid being dissolved in the theoretical proportion of aqueous sodium carbonate solution and 50 parts of crystallized sodium acetate being added. Several hours boiling is necessary to bring the reaction to completion. By addition of common salt to the cooled liquid the dyestuff is salted out in the form of a dark bronze crystalline powder. The dyestuff dyes wool in a sulphuric acid bath quiet, greenish blue tints of excellent fastness to light and alkalis.

The dyestuff dissolves in concentrated sulphuric acid to a grass green solution.

In this example there can be substituted for the nitroso-meta-chlorodiethylaniline the corresponding dimethyl homologue; and instead of meta-sulphophenyl-2-naphthylamine, para-sulphophenyl-2-naphthylamine, phenyl-2-naphthylamine-6-or 7-sulphonic acid or corresponding substitution products may be used. Further instead of 1-chloro-3-diethylisorosinduline-6:12-disulphonic acid, 1-chloro-3-dimethylisorosinduline-6:12-disulphonic acid, 1-bromo-3-diethylisorosinduline-6:12-disulphonic acid, a chloro-substituted diethylisorosinduline-trisulphonic acid and so on can be be used, the essential condition being that the isorosinduline-sulphonic acid contains a halogen in 1-position, a sulphogroup in 6-position and at least another sulpho-group in another position.

What I claim is:—

1. A process for the manufacture of acid dyestuffs of the phenonaphthosafranine series, consisting in treating an unsymmetrical N-alkyl-paraphenylenediamine derivative having a sulpho group in ortho position to the free amino group with an isorosindulinesulphonic acid having a halogen in 1-position, a sulpho-group in 6-position and at least another sulpho-group in another position, and corresponding with the probable general formula:

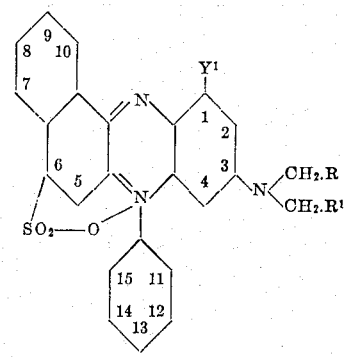

wherein R and $R^1$ represent hydrogen or alkyl, and $Y^1$ represents halogen.

2. A process for the manufacture of acid dyestuffs of the phenonaphthosafranine series, consisting in treating a sulphonic acid of unsymmetrical N-alkyl-paraphenylenediamine having a sulpho group in ortho position to the free amino group with a 1-halogen-dialkyl-isorosinduline-sulphonic acid having a sulpho-group in 6-position and at least another sulpho-group in another position.

3. A process for the manufacture of acid dyestuff of the phenonaphthosafranine series, consisting in treating an unsymmetrical N-alkyl-paraphenylenediamine derivative having a sulpho group in ortho position to the free amino group with 1-chloro-dialkyl-isorosinduline-6:12-disulphonic acid.

4. A process for the manufacture of acid dyestuffs of the phenonaphthosafranine series, consisting in treating para-amino-mono-alkyl-ortho-toluidinesulphonic acid with 1-chloro-dialkyl-isorosindulin-6:12-disulphonic acid.

5. As new articles of manufacture, the herein described acid dyestuffs of the phenonaphthosafranine series, obtained by treating an unsymmetrical N-alkyl-paraphenylenediamine derivative having a sulpho group in ortho position to the free amino group with an isorosinduline-sulphonic acid having a halogen in 1-position, a sulphogroup in 6-position and at least another sulpho group in another position, and corresponding with the probable general formula:

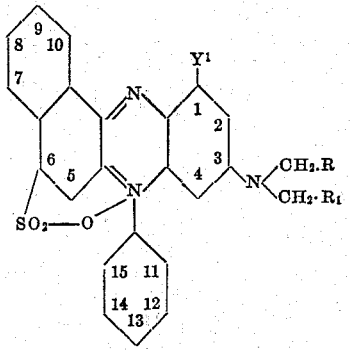

wherein R and R$^1$ represent hydrogen or alkyl and Y$^1$ represents halogen, the said dyestuffs constituting dark bronze crystalline powders dyeing wool in a sulphuric acid bath quiet, greenish blue tints of excellent fastness to light and alkalis.

6. As new articles of manufacture, the herein described acid dyestuffs of the phenonaphthosafranine series, obtained by treating para-amino-mono-alkyl-ortho-toluidine-sulphonic acid with 1-chloro-dialkyl-isorosinduline-6:12-disulphonic acid, said dyestuffs constituting dark bronze crystalline powders dyeing wool in a sulphuric acid bath quiet, greenish blue tints of excellent fastness to light and akalis.

In witness whereof I have hereunto signed my name this 9th day of January, 1928.

PAUL LAEUGER.